(12) United States Patent
Cho et al.

(10) Patent No.: US 11,125,931 B2
(45) Date of Patent: Sep. 21, 2021

(54) DISPLAY APPARATUS

(71) Applicant: SAMSUNG ELECTRONICS CO., LTD., Suwon-si (KR)

(72) Inventors: Jin Hyun Cho, Seoul (KR); Go Hyun Kim, Yongin-si (KR); Heongseog Lee, Hwaseong-si (KR); Hyun Jun Jung, Yongin-si (KR); Jong Hee Han, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/757,221

(22) PCT Filed: Oct. 16, 2018

(86) PCT No.: PCT/KR2018/012152
§ 371 (c)(1),
(2) Date: Apr. 17, 2020

(87) PCT Pub. No.: WO2019/078572
PCT Pub. Date: Apr. 25, 2019

(65) Prior Publication Data
US 2021/0191026 A1 Jun. 24, 2021

(30) Foreign Application Priority Data
Oct. 17, 2017 (KR) .................. 10-2017-0134569

(51) Int. Cl.
*F21V 8/00* (2006.01)
*G02B 6/00* (2006.01)

(52) U.S. Cl.
CPC ......... *G02B 6/0051* (2013.01); *G02B 6/0023* (2013.01); *G02B 6/0053* (2013.01); *G02B 6/0055* (2013.01); *G02B 6/0093* (2013.01)

(58) Field of Classification Search
CPC .. G02B 6/0026; G02B 6/0055; G02B 6/0023; G02B 6/0051; G02B 6/0053; G02B 6/0093
See application file for complete search history.

(56) References Cited

U.S. PATENT DOCUMENTS 9,657,920 B2 * 5/2017 Ishino ............... G02F 1/133617
10,527,772 B2 * 1/2020 Sohn .................... G02B 6/0088
(Continued)

FOREIGN PATENT DOCUMENTS

JP     2008-53198 A     3/2008
JP     2011-82590 A     4/2011
(Continued)

OTHER PUBLICATIONS

International Search Report (PCT/ISA/210) dated Feb. 7, 2019 by the International Searching Authority in counterpart International Patent Application No. PCT/KR2018/012152.
(Continued)

Primary Examiner — Karabi Guharay
(74) Attorney, Agent, or Firm — Sughrue Mion, PLLC

(57) ABSTRACT

The present disclosure relates to a display apparatus including a display panel, a light guide panel disposed in the rear of the display panel, a light source disposed adjacent to a side surface of the light guide panel, a quantum dot conversion member disposed to be inclined with respect to the light source, including quantum dot particles, and configured to convert properties of light emitted from the light source, and a transparent member including a first surface facing the light source, a second surface facing the quantum dot conversion member, and a third surface disposed adjacent to the side surface of the light guide panel, wherein the transparent member is configured to transmit at least one part of the light incident on the third surface to the side
(Continued)

surface of the light guide panel and reflect the other part of the light to the inside thereof.

15 Claims, 10 Drawing Sheets

(56) References Cited

U.S. PATENT DOCUMENTS

2013/0286327 A1 10/2013 Huang
2016/0266299 A1 9/2016 Yoon et al.
2017/0269279 A1 9/2017 Wyatt

FOREIGN PATENT DOCUMENTS

KR 10-2016-0110750 A 9/2016
KR 10-2017-0033972 A 3/2017
KR 10-2017-0036972 A 4/2017

OTHER PUBLICATIONS

Written Opinion (PCT/ISA/237) dated Feb. 8, 2019 by the International Searching Authority in counterpart International Patent Application No. PCT/KR2018/012152.
Communication dated Nov. 26, 2020, issued by the European Patent Office in counterpart European Application No. 18868192.8.

* cited by examiner

DISPLAY APPARATUS

TECHNICAL FIELD

The present disclosure relates to a display apparatus, and more particularly, to a display apparatus including an improved backlight unit.

BACKGROUND ART

In general, a display apparatus is a device for displaying an image, such as a monitor or a television. A self-light emitting display panel, such as an organic light-emitting diode (OLED), or a light-receiving/emitting display panel, such as a liquid crystal display (LCD) panel, is used in a display apparatus.

The present disclosure relates to a display module and display apparatus to which a light-receiving/emitting display panel is applied. The display apparatus to which a light-receiving/emitting display panel is applied includes a display panel consisting of a liquid crystal panel and displaying an image, and a backlight unit supplying light to the display panel, and the backlight unit includes a light source module having a light source, and a plurality of optical sheets and a light guide panel receiving light from the light source and guiding the light to the display panel, and the like.

In the existing display apparatuses, light emitted from a light source may improve color reproducibility through quantum dots (QDs). In the existing display apparatuses, such color reproducibility is implemented through a quantum dot sheet (QD sheet) provided at the rear of the display panel, which may cause cost increase of the display apparatus and problems in assembly.

DISCLOSURE

Technical Problem

The present disclosure is directed to providing a display apparatus with an improved structure to improve color reproducibility.

The present disclosure is directed to providing a display apparatus capable of maintaining color reproduction performance while minimizing a quantum dot conversion member.

Technical Solution

One aspect of the present disclosure provides a display apparatus including a display panel, a light guide panel disposed in the rear of the display panel, a light source disposed adjacent to a side surface of the light guide panel, a quantum dot conversion member disposed to be inclined with respect to the light source, including quantum dot particles, and configured to convert properties of light emitted from the light source, and a transparent member including a first surface facing the light source, a second surface facing the quantum dot conversion member, and a third surface disposed adjacent to the side surface of the light guide panel, wherein the transparent member is configured to transmit at least one part of the light incident on the third surface to the side surface of the light guide panel and reflect the other part of the light to the inside thereof. The transparent member may include a triangular pillar shape formed by the first surface, the second surface and the third surface, and the transparent member may be disposed between the light source and the quantum dot conversion member.

The first surface and the second surface may be disposed to be inclined at about 35 degrees to 75 degrees.

The light source may be disposed substantially parallel to the first surface, and the quantum dot conversion member may be disposed substantially parallel to the second surface.

The first surface may be configured to allow light emitted from the light source to be incident and to allow the incident light to be transmitted through the second surface or the third surface.

The second surface may be configured to allow light transmitted from the first surface or reflected from the third surface to be transmitted to the quantum dot conversion member, and to allow light converted by the quantum dot conversion member to be incident again and allow the converted light to be transmitted to the first surface or the third surface.

The third surface may be configured to allow light incident at a predetermined angle among light incident through the first surface or the second surface to be transmitted to the side surface of the light guide panel and to allow light incident at an angle larger than the predetermined angle to be reflected toward the first surface or the second surface.

The predetermined angle may be in the range of 60 to 80 degrees.

The display apparatus may further include a printed circuit board on which the light source and the quantum dot conversion member are mounted and a heat sink disposed in contact with the printed circuit board, and heat generated from the quantum dot conversion member may be directly transferred to the heat sink through the printed circuit board.

The transparent member may be configured to limit heat generated from the light source to be transferred to the quantum dot conversion member.

The printed circuit board may include a flat portion disposed parallel to the light guide panel and an inclined portion extending to be inclined with respect to the flat portion.

The quantum dot conversion member may be disposed on the flat portion, and the light source may be disposed on the inclined portion.

The quantum dot conversion member may be disposed on the inclined portion, and the light source may be disposed on the flat portion.

The quantum dot conversion member may be disposed on a front surface of the flat portion, and the heat sink may be disposed on a rear surface of the flat portion.

The display apparatus may further include an interspace formed between the third surface and the side surface of the light guide panel and configured to allow light transmitted from the third surface to move to the side surface of the light guide panel, and a reflective member disposed on one side of the interspace and configured to reflect light traveling from the interspace to the outside of the side surface of the light guide panel toward the side surface of the light guide panel.

Another aspect of the present disclosure provides a display apparatus including a display panel, a light guide panel disposed in the rear of the display panel, a light source disposed on a side surface of the light guide panel, a quantum dot conversion member including quantum dot particles and configured to convert properties of light emitted from the light source, a printed circuit board including an inclined portion on which the light source is disposed and configured to be inclined with respect to a side surface of the light guide panel, and a flat portion on which the quantum dot conversion member is disposed and configured to be disposed parallel to the light guide panel, and a transparent member disposed between the light source and the quantum dot conversion member and configured to transmit light emitted from the light source and light converted by the quantum dot conversion member to the side surface of the light guide panel.

Advantageous Effects

The present disclosure directs to improve color reproducibility in a display apparatus that displays an image using light incident from a backlight unit.

In the present disclosure, a light source and a quantum dot conversion member are arranged to be spaced apart from each other and to be inclined so that the quantum dot conversion member can be prevented from being damaged by heat generated from the light source, and a transparent member is disposed between the light source and the quantum dot conversion member so that the light emitted from the light source and the light converted by the quantum dot conversion member can be effectively transmitted to a light guide panel.

MODE OF THE INVENTION

Figure 1:
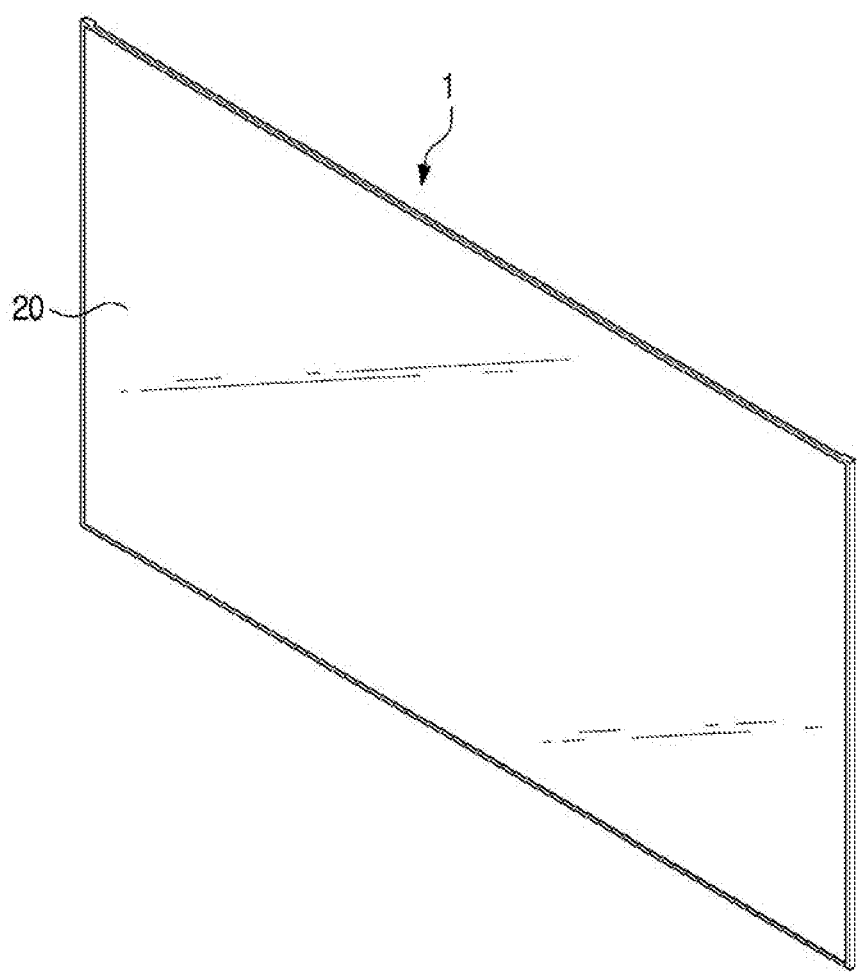
FIG. 1 is a perspective view of a display apparatus according to an embodiment of the present disclosure.

The embodiments described in the present specification and the configurations shown in the drawings are only examples of preferred embodiments of the present disclosure, and various modifications may be made at the time of filing of the present disclosure to replace the embodiments and drawings of the present specification.

Like reference numbers or signs in the various drawings of the application represent parts or components that perform substantially the same functions.

The terms used herein are for the purpose of describing the embodiments and are not intended to restrict and/or to limit the present disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to distinguish one component from another. For example, without departing from the scope of the present disclosure, the first component may be referred to as a second component, and similarly, the second component may also be referred to as a first component. The term "and/or" includes any combination of a plurality of related items or any one of a plurality of related items.

Hereinafter, embodiments of the present disclosure will be described in detail with reference to the accompanying drawings.

Figure 2:
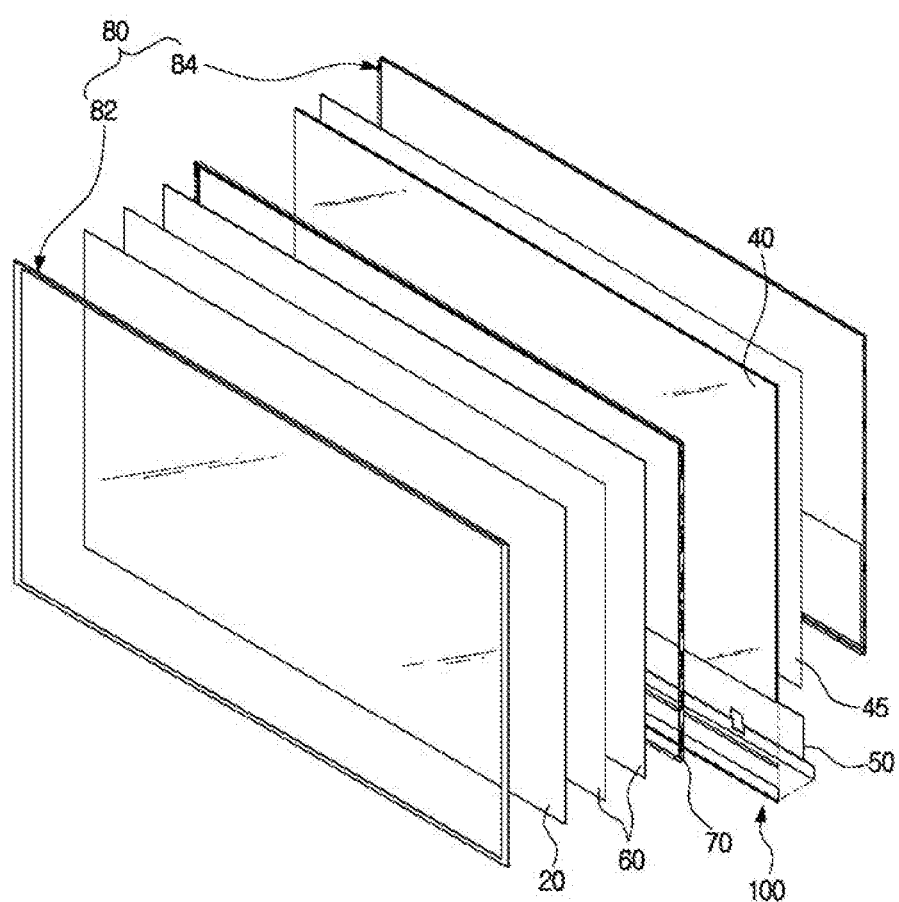
FIG. 2 is an exploded perspective view of the display apparatus according to an embodiment of the present disclosure.
Figure 3:
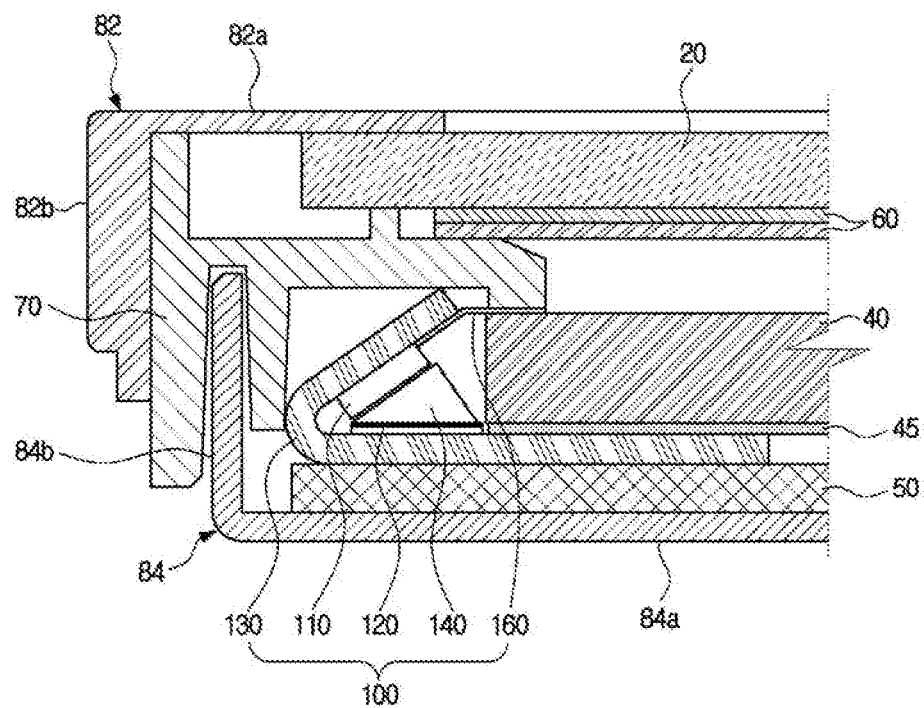
FIG. 3 is a cross-sectional view of a portion of the display apparatus according to an embodiment of the present disclosure.

FIG. 1 is a perspective view of a display apparatus according to an embodiment of the present disclosure, FIG. 2 is an exploded perspective view of the display apparatus according to an embodiment of the present disclosure, and FIG. 3 is a cross-sectional view of a portion of the display apparatus according to an embodiment of the present disclosure.

The present disclosure illustrates a flat display apparatus 1 as an example, but may be applied to a curved display apparatus or a bendable display apparatus.

The terms 'front' and 'front surface' used herein are based on a front surface of a display panel 20 side which displays an image, based on the display apparatus 1 illustrated in FIG. 1. Based on the above, the terms 'upper' and 'lower' indicate an upper side and a lower side of the display apparatus 1 illustrated in FIG. 1, and the terms 'opposite sides' and 'one side' indicate the left and right directions of the display apparatus 1 illustrated in FIG. 1.

The display apparatus 1 includes a display module for displaying an image.

The display module includes a display panel 20 on which an image is displayed, and a backlight unit configured to supply light to the display panel 20. The backlight unit may include a light source module 100 and an optical sheet 60. That is, the backlight unit may include the light source module 30 disposed in the rear of the display panel 20, a light guide panel 40 disposed in a space between the display panel 20 and the light source module 100 such that light transmitted from a rear side thereof is diffused and transmitted to the display panel 20 positioned at a front side thereof, the optical sheet 60 disposed between the light guide panel 40 and the display panel 20 to change optical properties, a middle mold 70 configured to support the display panel 20 and the light guide panel 40, and a display chassis 80 forming an outer appearance.

The optical sheet 60 may include various sheets. For example, the optical sheet 60 may include a diffusion sheet, a prism sheet, a protective sheet, and a brightness enhancing film. The drawings (FIGS. 2 and 3) illustrate that the optical sheet 60 is configured by two sheets for convenience, the present disclosure is not limited thereto and the optical sheet 60 may be formed in a plurality of configurations as described above.

The display chassis 80 includes a top chassis 82 coupled to a front side of the middle mold 70 to maintain a state in which the display panel 20 is installed on the middle mold 70, and a bottom chassis 84 coupled to a rear side of the middle mold 70 and in which the light source module 100 is disposed on inner opposite sides thereof.

The light source module 100 may be disposed inside the bottom chassis 84 to irradiate light toward an inner center side of the bottom chassis 84, and in detail, toward a side surface 41 of the light guide panel 40. In an embodiment of the present disclosure, the light source module 100 is disposed at a lower portion of the display apparatus 1, but is not limited thereto, and the light source module may be applied only to at least one side of the lower portion, sides, and an upper portion of the display apparatus 1, or may be applied entirely along the display apparatus 1. A light source of an edge type display manner as above may be applied, or a light source of a direct type display manner may be applied.

The light guide panel 40, the display panel 20, and the top chassis 82 are sequentially installed on the front side of the middle mold 70, and the bottom chassis 84 is installed on the rear side of the middle mold 70, so that the respective components are not only supported by the middle mold 70, but also the display panel 20 and the bottom chassis 84 are maintained in a state of being spaced apart from each other.

The top chassis 82 includes a bezel portion 82*a* covering a front outer edge of the display panel 20, and a top side portion 82*b* bent backward from an end of the bezel portion 82*a* to cover a side surface of the middle mold 70.

The bottom chassis 84 includes a rear side portion 84*a* forming a rear surface of the display module, and a bottom side portion 84*b* extending forward from an edge of the rear side portion and coupled to the inside of the middle mold 70.

The light source module 100 may include a light source 110 and a printed circuit board 120.

The light source 110 includes a light emitting device (LED). A plurality of the light source 110 may be provided, and the plurality of light source 110 may be arranged to be spaced apart from each other at a predetermined interval. The light source module 100 will be described later in detail.

A heat sink 50 to dissipate heat generated from the light source module 100 may be disposed between the light source module 100 and the bottom chassis 84. The heat sink 50 may be configured to transfer heat generated from the light source module 100 to the bottom chassis 84 to dissipate high heat generated from the light source module 100 to the outside. Accordingly, the heat sink 50 may dissipate high heat generated by the light source module 100 to prevent malfunctions that may occur due to the high temperature of the light source module 100, thereby improving reliability of the display apparatus 1.

The light guide panel 40 is disposed to be spaced apart from the bottom chassis 84 so that the light source 110 is disposed on opposite sides of a space between the light guide panel 40 and an inner surface of the bottom chassis 84, that is, on the bottom side portion 84*b* side.

The light guide panel 40 may include a reflective member 45 on a rear surface thereof. The reflective member 45 may be provided on the rear surface of the light guide panel 40 so that all the light generated from the light source package 31 may direct to a front surface thereof. The reflective member 45, which is a reflector, may be provided separately from the light guide panel 40 and disposed on the rear surface of the light guide panel 40, or may be integrally formed with the light guide panel 40. In addition, by applying a reflective coating on the rear surface of the light guide panel 40, the same effects as described above may be obtained.

The light guide panel 40 is provided to transmit light generated from the light source. To this end, the light guide panel 40 may be formed of a transparent resin material. That is, light incident by the light source module 100 from the side surface 41 of the light guide panel 40 may be transmitted to a front surface of the light guide panel 40 to irradiate light to the display panel 20 side. The light guide panel 40 may be disposed to be spaced apart from the light source at a predetermined interval to minimize deformation due to heat generated from the light source.

Hereinafter, the light source module 100 will be described in detail.

The light source module 100 may include the light source 110. The light source 110 may emit blue-based light. In this case, the blue-based light may be light partially biased toward green. The light source 110 may be formed of at least one of a blue QD-based electroluminescent device, a blue fluorescent-based electroluminescent device, a blue thermally activated delayed fluorescent-based electroluminescent device, and a blue phosphorescent-based electroluminescent device.

The blue light generated in the light source 110 may be converted into light having a color of RGB (white, red, green, blue) through the quantum dot conversion member 120.

The quantum dot conversion member 120 may convert the color of light emitted from the light source 110 by using quantum dots (QDs). Therefore, the quantum dot conversion member 120 may be expressed as a color adjuster.

The quantum dot conversion member 120 may convert the color of the light, which is emitted from the light source 110 and incident thereon, and may emit light of different colors. For example, the quantum dot converter 120 may convert blue light, which is emitted from the light source 110 and incident thereon, into red light and green light, and then emit the lights to the outside. In detail, the quantum dot conversion member 120 may emit light having a different color from incident light by changing the wavelength of the incident light (wavelength shift).

Quantum dots emit light of a specific wavelength by emitting light of their own or absorbing light when a voltage is applied.

Electrons in a quantum dot are located at a low energy level (or band) in a stable state. In this state, when the quantum dot absorbs light from the outside, electrons in the low energy level move to a high energy level (or band). Because electrons located at the high energy level are in an unstable state, the electrons naturally move from the high energy level to the low energy level. As such, while moving from the high energy level to the low energy level, the electrons emit light as much as the energy difference between the high energy level and the low energy level. In this case, the wavelength of the emitted light is determined by the energy difference between the high energy level and the low energy level.

In particular, the smaller the size of a quantum dot may emit light of a shorter wavelength, the larger the size of a quantum dot may emit light of a longer wavelength. For example, a quantum dot of about 2 nanometers (nm) in diameter may emit blue light, and a quantum dot of about 10 nanometers (nm) in diameter may emit red light.

In addition, when quantum dots of various sizes are used, light of various wavelengths from red light to blue light may be output. That is, when quantum dots of various sizes are used, light having natural colors may be generated.

The quantum dot conversion member 120 may be manufactured by dispersing the quantum dots described above in a resin. When light is incident from the light source 110 to the quantum dot conversion member 120, the incident light excites electrons of the quantum dots included in the quantum dot conversion member 120. In other words, electrons in the low energy level (or band) move to the high energy level (or band) by the incident light.

Thereafter, while the excited electrons move from the high energy level to the low energy level, the quantum dots output light of various wavelengths depending on the size thereof. As such, light having various wavelengths may generate an image by passing through the light guide panel 40, the optical sheet 60, and the display panel 20.

The quantum dot conversion member 120 may include green light quantum dots capable of emitting green-based light and red light quantum dots capable of emitting red-based light. Green light quantum dot particles 132 may be particles having a particle width of about 2 nanometers to about 3 nanometers, and red light quantum dot particles 122 may be particles having a particle width of about 5 nanometers to about 6 nanometers.

Accordingly, when the blue-based light emitted from the light source 110 is incident on the quantum dot conversion member 120, the green-based light and the red-based light may be emitted by the green light quantum dots and the red light quantum dots.

Finally, by the blue light emitted from the light source 110 and the green light and the red light emitted from the quantum dot conversion member 120, white light in which three lights having different wavelengths are mixed may be incident on the side surface 41 of the light guide panel 40.

The light guide panel 40 may be configured to guide the white light incident on the side surface 41 to the front of the light guide panel 40 so that the white light is irradiated onto the display panel 20.

In the case of a display apparatus using a conventional quantum dot conversion member, the quantum dot conversion member is provided in the form of a quantum dot sheet and is disposed on the front surface of the light guide panel to convert light emitted from the front surface of the light guide panel, so that white light in which three lights having different wavelengths are mixed is emitted to the display panel side. In this case, the quantum dot sheet is processed with an area corresponding to the front surface of the light guide panel, but the production cost increases due to the large area to be processed.

In addition, in the case of a conventional display apparatus for solving the above problem, white light is irradiated to the display apparatus in a method in which the quantum dot conversion member is applied or attached to a surface of the light source so that the light irradiated to the light guide panel is converted into white light and then emitted to the light guide panel. In this case, however, although the area where the quantum dot conversion member is applied or adhered is considerably reduced compared to the conventional method so that the production cost is significantly reduced, the characteristics of the quantum dots of the quantum dot conversion member are changed due to high heat generated from the light source, which degrades performance. That is, the light emitting region of the quantum dots is reduced as an inorganic material surrounding the quantum dots is separated by the high heat and thus the efficiency of emitting light is reduced, thereby reducing overall performance.

In order to solve the above problems, the light source module 100 according to an embodiment of the present disclosure may be radiated by disposing the light source 110 and the quantum dot conversion member 120 to be spaced apart from each other, and the white light formed by the quantum dot conversion member 120 and the light source 110 through the transparent member 140 disposed between the light source 110 and the quantum dot conversion member 120 may be efficiently irradiated to the side surface 41 of the light guide panel 40.

Hereinafter, the configuration of the light source module 100 and the process of transmitting the light to the light guide panel 40 will be described in detail.

Figure 4:
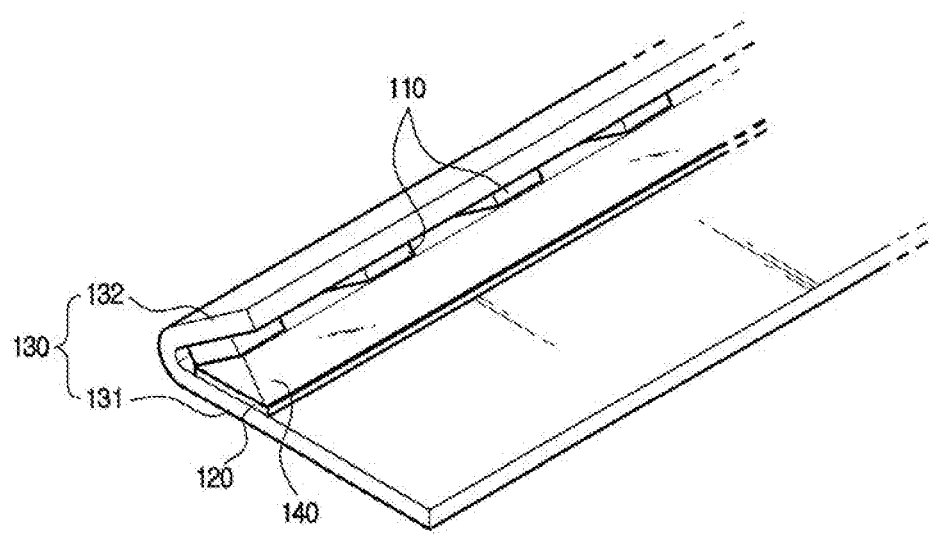
FIG. 4 illustrates a configuration of a part of the display apparatus according to an embodiment of the present disclosure.
Figure 5A:
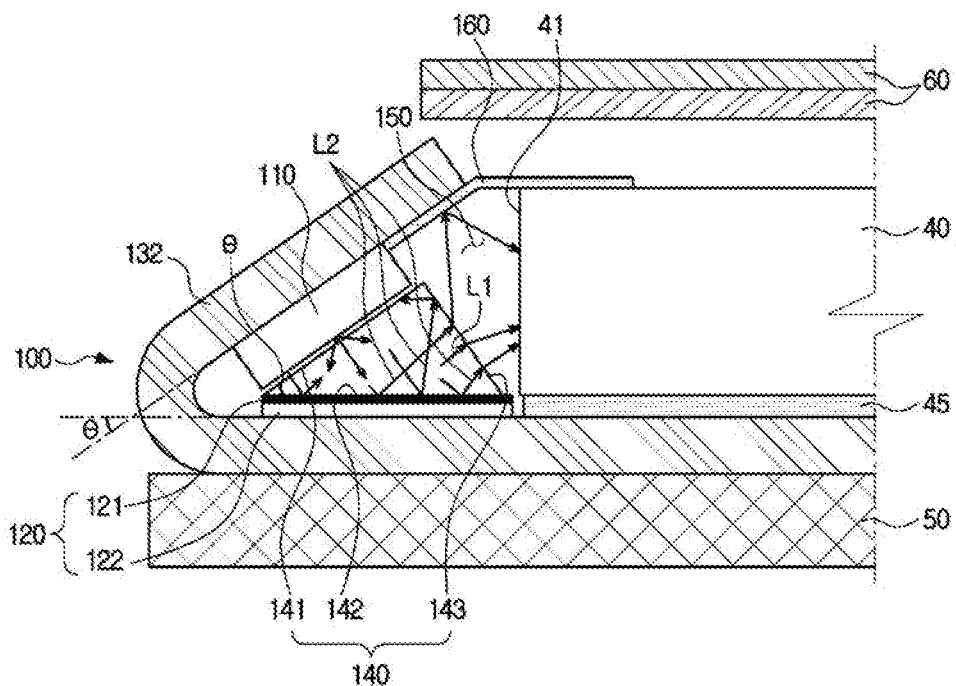
FIG. 5 schematically illustrates light traveling paths in the display apparatus according to an embodiment of the present disclosure.
Figure 5B:
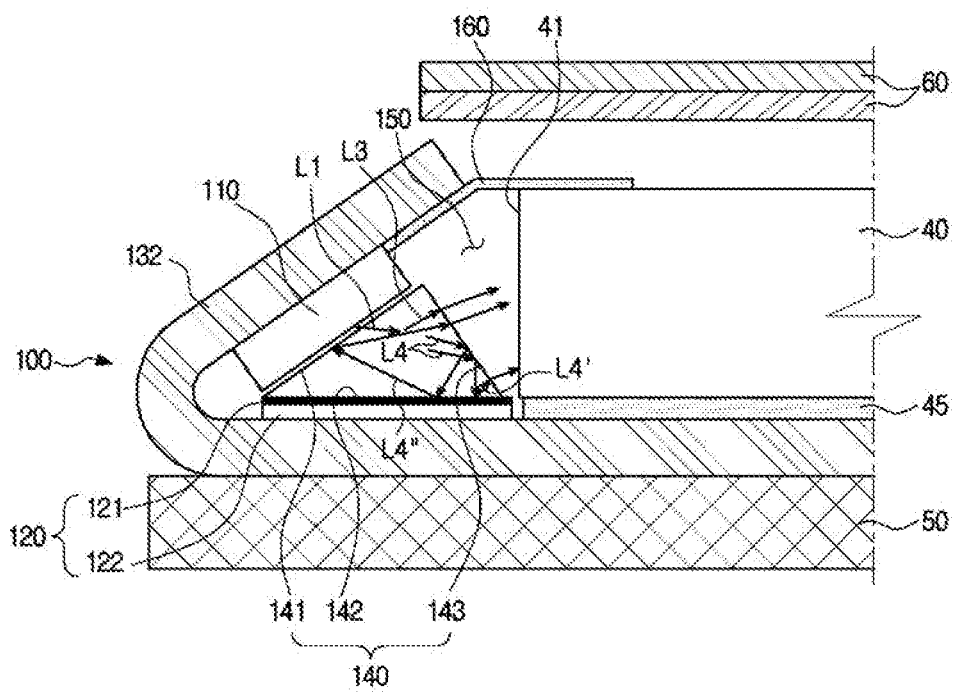
Figure 5C:
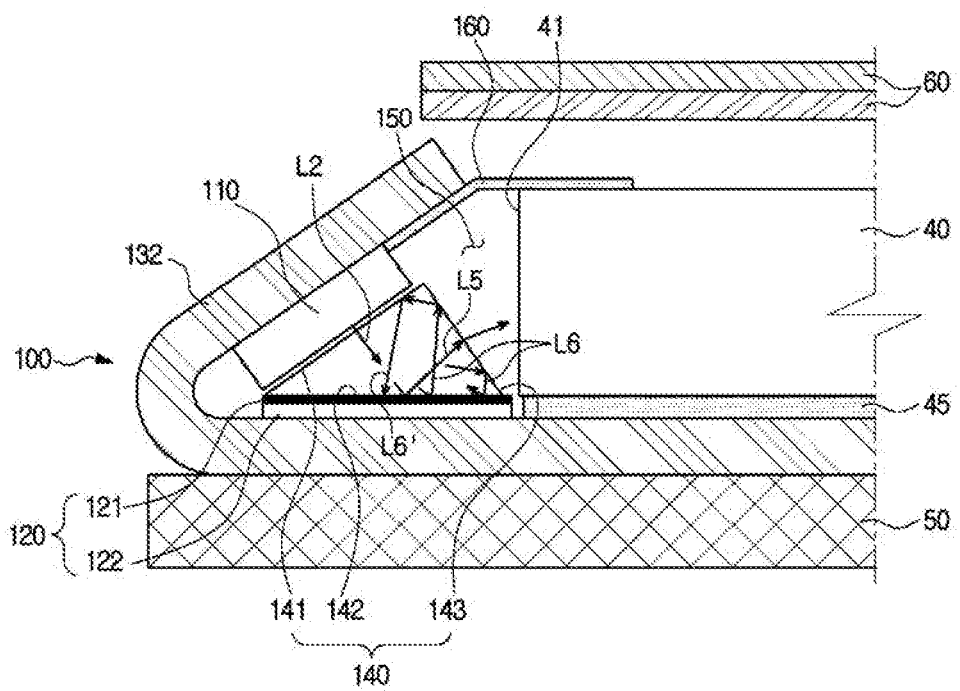
Figure 6:
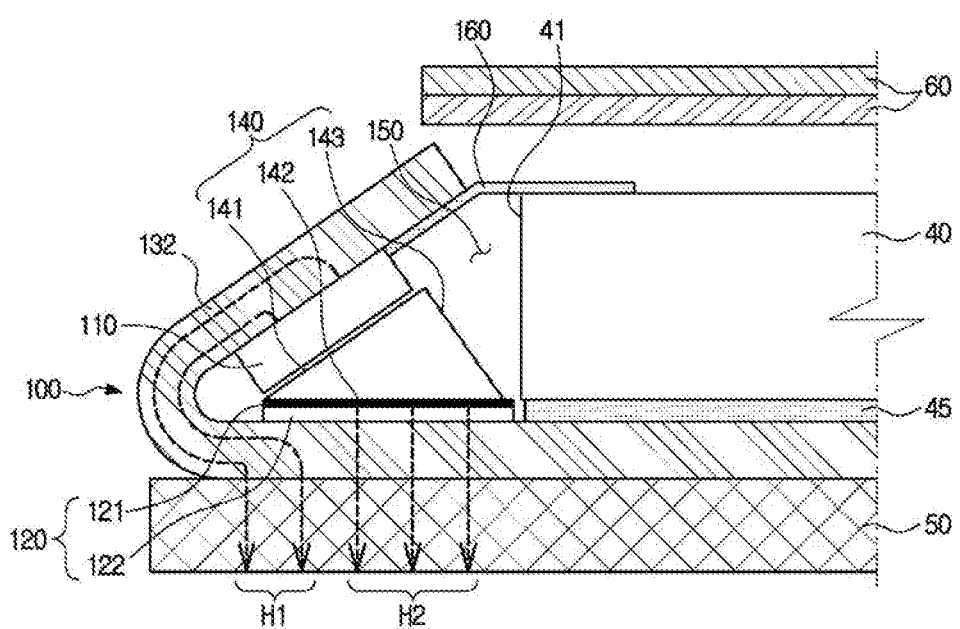
FIG. 6 schematically illustrates the flow of heat in the display apparatus according to an embodiment of the present disclosure.

FIG. 4 illustrates a configuration of a part of the display apparatus according to an embodiment of the present disclosure, FIGS. 5A to 5C schematically illustrate light traveling paths in the display apparatus according to an embodiment of the present disclosure, and FIG. 6 schematically illustrates the flow of heat in the display apparatus according to an embodiment of the present disclosure.

As illustrated in FIGS. 4 and 5A, the light source 110 and the quantum dot conversion member 120 may be mounted on a printed circuit board 130. The printed circuit board 130 may include a metal material. In detail, the printed circuit board 130 may include a flat portion 131 provided in parallel with the rear surface of the light guide panel 40 and extending from the rear surface of the light guide panel 40 to the side surface 41, and an inclined portion 132 extending to be inclined from one side of the flat portion 131 with respect to the side surface 41 of the light guide panel 40. The light source 110 may be mounted on the inclined portion 132, and the quantum dot conversion member 120 may be mounted on the flat portion 131.

That is, the flat portion 131 may be disposed to be orthogonal to the side surface 41 of the light guide panel 40, and the inclined portion 132 may be disposed to be inclined with respect to the side surface 41 of the light guide panel 40. Accordingly, the quantum dot conversion member 120 disposed on the flat portion 131 may be disposed to be orthogonal to the side surface 41 of the light guide panel 40, and the light source 110 disposed on the inclined portion 132 may be disposed to be inclined with respect to the side surface 41 of the light guide panel 40.

In other words, the printed circuit board 130 may include a first region (inclined portion) formed to be inclined with respect to the light guide panel 40, and a second region (flat portion) extending from one end of the first region toward the light guide panel 40.

The first region is disposed to be inclined with respect to the side surface 41 of the light guide panel 40 and may extend from one end of the first region, which is positioned furthest from the side surface of the light guide panel 40, toward the side surface 41 of the light guide panel 40. The second region may be disposed in parallel with the light guide panel 40. That is, the second region may be disposed in parallel with the front and rear surfaces of the light guide panel 40.

The light source 110 and the quantum dot conversion member 120 may be disposed to be spaced apart from each other on the printed circuit board 130. Accordingly, high heat generated from the light source 110 may be prevented from being transferred to the quantum dot conversion member 120.

As the light source 110 is disposed to be inclined with respect to the quantum dot conversion member 120, one part L2 of blue light emitted from the light source 110 may be advanced to the quantum dot conversion member 120 and converted on the quantum dot conversion member 120, and then red light and green light may be emitted.

As described above, the quantum dot conversion member 120 may be manufactured by dispersing a plurality of red light quantum dots and a plurality of green light quantum dots in a resin. Accordingly, the plurality of quantum dots may be formed in a layer form.

The quantum dot conversion member 120 may include a reflective layer 122 disposed below the quantum dot layer 121 such that light converted in the quantum dot layer 121 may be reflected. That is, the part L2 of the blue light emitted from the light source 110 may be converted into green light or red light by a plurality of quantum dots and reflected by the reflective layer 122 to change a traveling direction thereof.

The other part L1 of the blue light emitted from the light source 110 and the red light and green light L2 reflected from the quantum dot conversion member 120 are mixed to form white light, and the mixed white light may be incident on the side surface 41 of the light guide panel 40. That is, the other part L1 of the blue light emitted from the light source 110 may be directly irradiated to the side surface 41 of the light guide panel 40, and the red light and green light L2 reflected from the quantum dot conversion member 120 may be irradiated to the side surface 41 of the light guide panel 40.

In this case, although the light source 110 is mounted on the inclined portion 131 so that a large amount of light L2 is emitted toward the quantum dot conversion member 120, because the amount of light L1 emitted directly toward the side surface 41 of the light guide panel 40 is also large, the light incident on the light guide panel 40 finally may be formed as white light including a large amount of blue light.

To prevent this, the light source module 100 may include a transparent member 140 configured to transmit only a part of the light emitted from the light source 110 and the quantum dot conversion member 120 to the side surface 41 of the light guide panel 40.

As illustrated in FIGS. 5B and 5C, the transparent member 140 may transmit one parts L3 and L5 of light incident on a transparent portion of the transparent member 140 and may reflect the other parts L4 and L6 of light to change the path of the light.

In detail, the transparent member 140 may guide a path of light directing directly from the light source 110 to the light guide panel 40 such that the light may direct back to the light guide panel 40 after transmitting the quantum dot conversion member 120 by particularly reflecting the light directing directly from the light source 110 to the light guide panel 40, to the opposite side.

Although the amount of light L2 emitted from the light source 110 toward the quantum dot conversion member 120 may be partially adjusted by adjusting an inclination angle of the inclined portion 132 with respect to the flat portion 131 without the transparent member 140, all paths of light emitted in all directions through the inclination angle of the inclined portion 132 may not be adjusted.

Therefore, the light source module 100 according to an embodiment of the present disclosure includes the transparent member 140 and may be configured such that high-definition white light is incident on the light guide panel 40 by adjusting a ratio of blue light, green light, and red light as the path of light transmitted through the transparent member 140 is guided.

The transparent member 140 may be disposed between the light source 110 and the quantum dot conversion member 120. In detail, the transparent member 140 is disposed between the light source 110 and the side surface 41 of the quantum dot conversion member 120 and the light guide panel 40 and may be configured such that the light L1 emitted from the light source 110 and the light L2 reflected through the quantum dot conversion member 120 are incident on the side surface 41 of the light guide panel 40 by being transmitted through the transparent member 140.

The transparent member 140 may have a triangular pillar shape. The transparent member 140 may be provided to extend along a direction in which the plurality of light sources 110 is disposed. The transparent member 140 may include a first surface 141 disposed to correspond to the light source 110, a second surface 142 disposed to correspond to the quantum dot conversion member 120, and a third surface 143 disposed adjacent to the side surface 41 of the light guide panel 40. The first surface 141, the second surface 142, and the third surface 143 may form the triangular pillar shape of the transparent member 140.

The transparent member 140 may include a transparent material through which light may be transmitted. In detail, the transparent member 140 may be formed of a material such as acrylic, silicone, and PET.

The first surface 141 may be disposed substantially parallel to the light source 110 and adjacent to the light source 110. That is, the first surface 141 may be disposed to be inclined with respect to the side surface 41 of the light guide panel 40 at approximately the same angle as the light source 110 and the inclined portion 132. In other words, the first surface 141 may be provided to face the light source 110. The first surface 141 may be formed such that light emitted from the light source 110 may be transmitted into the transparent member 140. The light transmitted through the first surface 141 may be incident on the second surface 142 or the third surface 143 in the transparent member 140.

The second surface 142 may be disposed substantially parallel to the quantum dot conversion member 120 and adjacent to the quantum dot conversion member 120.

One end of the first surface 141 and one end of the second surface 142 may be disposed to be in contact with each other, and thus the inclination angle may be formed between the first surface 141 and the second surface 142. That is, the first surface 141 and the second surface 142 may be arranged to have an inclination angle θ corresponding to the inclination angle between the light source 110 or the inclined portion 132 and the quantum dot conversion member 120 or flat portion 131.

As described above, the one part L2 of the light transmitted through the first surface 141 may be incident to the second surface 142 in the transparent member 140. The light L2 incident on the second surface 142 may be transmitted through the second surface 142 and incident on the quantum dot conversion member 120. Accordingly, the other part L2 of the light emitted from the light source 110 may be incident on the quantum dot conversion member 120 through the first surface 141 and the second surface 142.

The light L2 incident on the quantum dot conversion member 120 may be incident on the second surface 142 again by being reflected after being converted. The light incident on the second surface 142 may travel toward the first surface 141 or the third surface 143 in the transparent member 140.

The third surface 143 may be disposed such that the other end of the first surface 141 and the other end of the second surface 142 are connected to each other. The third side 143 is disposed adjacent to the side surface 41 of the light guide panel 40 and may be a transmission surface through which light incident on the transparent member 140 by the light source 110 and the quantum dot conversion member 120 is finally transmitted toward the light guide panel 40.

The light L1 directly incident from the light source 110, the light L2 reflected by the quantum dot conversion member 120, or the light reflected through the quantum dot conversion member 120 and then reflected in the transparent member 140 again may be incident on the third surface 143 and finally pass through the outside of the transparent member 140 to travel to the light guide panel 40.

However, all the light incident on the third surface 143 does not travel toward the light guide panel 40 by being transmitted through the third surface 143, the lights L4 and L6 incident on the third surface 143 at an incidence angle larger than a predetermined incidence angle among the light incident on the third surface 143 may be reflected by the third surface 143. That is, the at least one parts L3 and 5 of the light incident on the third surface 143 are transmitted toward the light guide panel 40, and the other parts L4 and L6 of the light may not be transmitted through the third surface 143 and may be reflected to the inside of the transparent member 140.

This is to reduce the amount of blue light in the white light traveling to the light guide panel 40 at a predetermined ratio by limiting the amount of the light L3 directing directly to the light guide panel 40 from the light source 110 without passing through the quantum dot conversion member 120.

The light L4 incident on the third surface 143 at an incidence angle larger than the predetermined incidence angle with respect to the third surface 143 among the light L1 directing directly to the light guide panel 40 from the light source 110 may not be transmitted through the third surface 143 and may be reflected to the inside of the transparent member 140 by the third surface 143.

Accordingly, the light L4 reflected by the third surface 143 may be changed in direction to travel toward the quantum dot conversion member 120 and may be directly incident (light L4') to the third surface 143 again by being reflected after being converted by the quantum dot conversion member 120, or may be incident (light L4") to the third surface 143 after additional reflection in the transparent member 140.

In addition, the light reflected by the third surface 143 may be incident to the quantum dot conversion member 120 side through additional reflection inside the transparent member 140 after the direction thereof is changed. The light converted after being incident on the quantum dot conversion member 120 through additional reflection may be incident directly to the third surface 143 by being reflected, or may be incident to the third surface 143 after additional reflection inside the transparent member 140.

The light L3 incident on the third surface 143 at an incidence angle smaller than the predetermined incidence angle among the light incident directly on the third surface 143 from the light source 110 may not be reflected by the third surface 143 and may pass through the third surface 143 to travel toward the light guide panel 40. Because the light L3 transmitted through the third surface 143 has passed through the transparent member 140 without passing through the quantum dot conversion member 120, blue light emitted from the light source 110 may be maintained.

As such, only the one part L3 of the light emitted directly to the third surface 143 from the light source 110 passes through the transparent member 140, and the rest part L4 of the light is reflected by the third surface 143 and is incident on the quantum dot conversion member 120 through additional reflection inside the transparent member 140, so that finally, the ratio of the amount of the blue light L3 of the light emitted from the light source module 100 is reduced.

The light L2 directing to the quantum dot conversion member 120 from the light source 110 may be reflected after the property of the light is converted in the quantum dot conversion member 120 and may direct to the third surface 143. At this time, the light L5 incident on the third surface 143 with an incidence angle smaller than the predetermined incidence angle among the light reflected on the third surface 143 may be transmitted through the third surface 143 to be irradiated to the side surface 41 of the light guide panel 40, and the light L6 incident on the third surface 143 with an incidence angle larger than the predetermined incidence angle may not be transmitted through the third surface 143, may be reflected by the third surface 143 and reflected again inside the transparent member 140, and then incident (light LC) again to the third surface 143.

An interspace 150, which is a space through which light transmitted through the transparent member 140 travels to the light guide panel 40, may be provided between the transparent member 140 and the light guide panel 40. The interspace 150 may be a space that does not include a medium other than air.

That is, the interspace 150 is provided between the third surface 143 of the transparent member 140 and the light guide panel 40, and by the interspace 150 the light L4 and L6 incident on the third surface 143 at an angle larger than or equal to the predetermined incidence angle may not be transmitted through the third surface 143 and may be reflected.

Because the density of a medium in the transparent member 140 is greater than the density of a medium in the interspace 150, when the light is incident on the third surface 143 at an angle larger than the predetermined incidence angle, the light may not be transmitted through the third surface 143.

The predetermined incidence angle may vary depending on the type of material included in the transparent member 140. Because the medium of the interspace 150 is limited to air, the incidence angle at which light may be transmitted through the third surface 143 may be changed due to a density difference from the medium of the transparent member 140. For example, when the transparent member 140 is formed of an acrylic material, the predetermined incidence angle with respect to the third surface 143 may be about 30 degrees, and when the transparent member 140 is formed of a silicon material, the predetermined incidence angle with respect to the third surface 143 may be about 25 degrees.

An inclination angle $\theta$ between the light source 110 and the quantum dot conversion member 120 or the inclination angle $\theta$ between the first surface 141 and the second surface 142 may be in the range of about 35 and 75 degrees. It may be appropriate that the inclination angle $\theta$ may be about 55 degrees.

Light emitted from the light source 110 may be efficiently incident on the light guide panel 40 by directly passing through the transparent member 140 or by passing through the transparent member 140 via the quantum dot conversion member 120 within the range of the inclination angle $\theta$ described above. The inclination angle $\theta$ may be determined in consideration of an angle at which light emitted from the light source 110 is directly incident on the third surface 143 and an angle at which light emitted from the light source 110 is reflected from the quantum dot conversion member 120 and incident on the third surface 143.

That is, the predetermined incidence angle at which light may pass through the third surface 143 may be determined according to the type of the medium of the transparent member 140, and the ratio of the blue light emitted directly to the third surface 143 from the light source 110 and the red light and green light converted by the quantum dot conversion member 120 may be different according to the predetermined incidence angle with respect to the third surface 143, and thus together with the above considerations, the inclination angle $\theta$ may be determined in consideration of the predetermined incidence angle.

A reflective sheet 160 configured to reflect light directing to the outside of the side surface 41 of the light guide panel 40 among the light transmitted through the transparent member 140 to the side surface 41 of the light guide panel 40 may be disposed on one side of the interspace 150.

The reflective sheet 160 may be disposed between the transparent member 140 and the side surface 41 of the light guide panel 40 inside the interspace 150. In detail, the reflective sheet 160 may be configured to extend from an end portion of the inclined portion 132 adjacent to the light guide panel 40 to at least a portion of the front surface of the light guide panel 40 adjacent to the side surface 41 of the light guide panel 40. Through this configuration, the reflective sheet reflects light directly directing to the direction in which the optical sheet 60 is disposed among the light transmitted from the transparent member 140 and irradiates light to the side surface 41 of the light guide panel 40, thereby minimizing light loss.

Even when the light source 110 and the quantum dot conversion member 120 are disposed to be spaced apart from each other by the transparent member 140, high-definition white light may be irradiated to the light guide panel 40. As described above, as the light source 110 and the quantum dot conversion member 120 are disposed to be spaced apart from each other, the high heat generated from the light source 110 is not directly transferred to the quantum dot conversion member 120, so that the degradation of the efficiency of the quantum dot conversion member 120 caused by changing the characteristics of a plurality of quantum dots of the quantum dot conversion member 120 due to high heat may be prevented.

Although high heat generated from the light source 110 may be directly transferred to the quantum dot conversion member 120 when the quantum dot conversion member 120 is disposed in contact with the light source 110 as in the conventional case, as illustrated in FIG. 6, high heat H1 generated from the light source 110 of the light source module 100 according to an embodiment of the present disclosure is not directly transmitted to the quantum dot conversion member 120 and may be dissipated by moving to the heat sink 50 disposed on a rear side of the printed circuit board 130 along the printed circuit board 130.

Although heat H2 may be generated in the process of converting light in the quantum dot conversion member 120, the quantum dot conversion member 120 is disposed adjacent to the heat sink 50, and heat generated from the quantum dot conversion member 120 is directly transferred to the heat sink 50 through the printed circuit board 130, thereby facilitating heat dissipation.

In detail, although internal resistance is generated through light conversion inside the quantum dot conversion member 120 and thus the heat H2 is generated, in the quantum dot conversion member 120 provided in a sheet shape, as a surface of the sheet is provided in contact with the printed circuit board 130, the path through which the heat is transferred is shortly formed and the internal resistance is minimized, thereby preventing high temperature from being generated in the quantum dot conversion member 120.

As described above, the transparent member 140 provided between the light source 110 and the quantum dot conversion member 120 may be formed of a resin such as acrylic and silicone and such a resin material has a low thermal conductivity, and thus may serve as an insulating member preventing heat generated from the light source 110 from being transferred to the quantum dot conversion member 120 through the transparent member 140.

Therefore, the heat generated from the light source 110 is not transferred to the quantum dot conversion member 120 through the transparent member 140, but may be transferred to the heat sink 50 along the printed circuit board 130 to be dissipated.

Hereinafter, a light source module 100' of the display apparatus 1 according to another embodiment of the present disclosure will be described. Because configurations other than the light source module 100' described below are the same as in the display apparatus 1 according to an embodiment of the present disclosure, overlapping descriptions are omitted.

Figure 7:
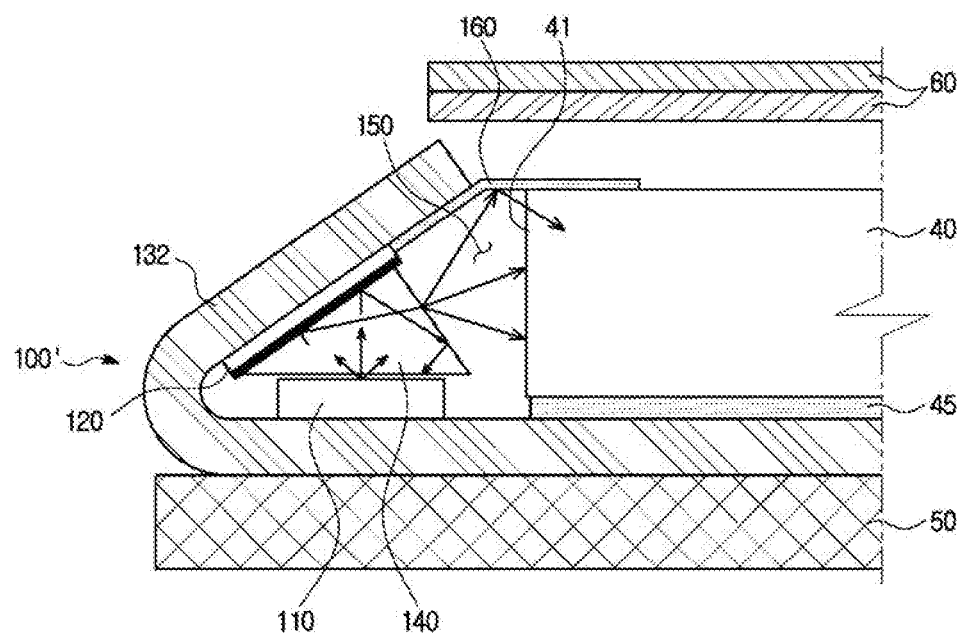
FIG. 7 schematically illustrates light traveling paths in a display apparatus according to another embodiment of the present disclosure.
Figure 8:
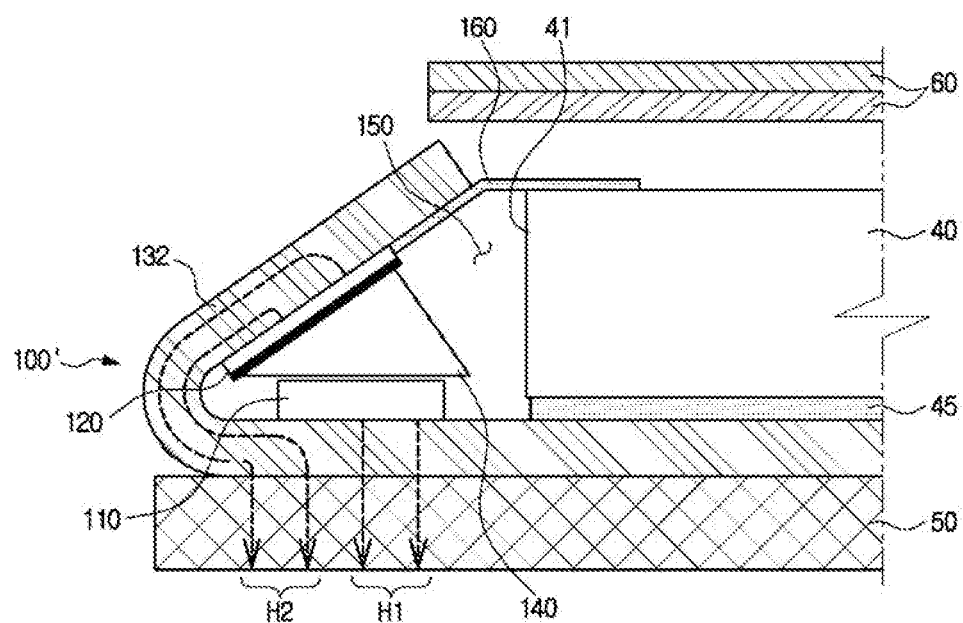
FIG. 8 schematically illustrates the flow of heat in a display apparatus according to another embodiment of the present disclosure.

FIG. 7 schematically illustrates light traveling paths in a display apparatus according to another embodiment of the present disclosure, and FIG. 8 schematically illustrates the flow of heat in a display apparatus according to another embodiment of the present disclosure.

As illustrated in FIG. 7, contrary to the light source module 100 according to an embodiment of the present disclosure, the light source 110 may be disposed on the flat portion 131 of the printed circuit board 130 of the light source module 100' according to another embodiment of the present disclosure. Accordingly, the quantum dot conversion member 120 may be disposed on the inclined portion 132 of the printed circuit board 130.

A part of the blue light emitted from the light source 110 disposed on the flat portion 131 may pass through the transparent member 140 to be irradiated to the side surface 41 of the light guide panel 40, and the other part of the blue light emitted from the light source 110 may reach the quantum dot conversion member 120 to be converted into red light or green light and then may pass through the transparent member 140 to be irradiated to the side surface 41 of the light guide panel 40. The process of reflecting light inside the transparent member 140 is the same as the process of reflecting light inside the transparent member 140 of the light source module 100 according to an embodiment of the present disclosure except that only the direction of light is changed, and thus description thereof is omitted.

As illustrated in FIG. 8, the high heat H1 generated from the light source 110 disposed on the flat portion 131 may be transferred to the heat sink 50 disposed on a rear surface of the flat portion 131 through the printed circuit board 130 to be dissipated. Unlike the light source module 100 according to an embodiment of the present disclosure, the light source 110 of the light source module 100' according to another embodiment of the present disclosure is disposed adjacent to the heat sink 50, thereby improving heat dissipation efficiency. Accordingly, the high heat H1 generated from the light source 110 is efficiently radiated, so that the efficiency and reliability of the light source 110 may be improved.

The quantum dot conversion member 120 disposed in the inclined portion 132 and the light source 110 disposed in the flat portion 131 are disposed to be spaced apart from each other, so that the high heat H1 generated from the light source 110 is not directly transferred to the quantum dot conversion member 120. In addition, because a thermal conductivity of the transparent member disposed between the light source 110 and the quantum dot conversion member 120 is small, heat generated from the light source 110 is not transferred to the quantum dot conversion member 120 through the transparent member 140 and may be directly transferred to the heat sink 50 through the printed circuit board 130.

When light is incident on the quantum dot conversion member 120, the heat H2 may be generated as the properties of the light change, and the heat H2 generated may be transferred to the flat portion 131 along the inclined portion 132 and then transferred to the heat sink 50 to dissipate heat.

While the present disclosure has been particularly described with reference to exemplary embodiments, it should be understood by those of skilled in the art that various changes in form and details may be made without departing from the spirit and scope of the present disclosure.

The invention claimed is:

1. A display apparatus comprising:
a display panel;
a light guide panel disposed in the rear of the display panel;
a light source disposed adjacent to a side surface of the light guide panel;
a quantum dot conversion member disposed to be inclined with respect to the light source, comprising quantum dot particles, and configured to convert properties of light emitted from the light source; and
a transparent member comprising a first surface facing the light source, a second surface facing the quantum dot conversion member, and a third surface disposed adjacent to the side surface of the light guide panel, wherein the transparent member is configured to transmit at least one part of the light incident on the third surface to the side surface of the light guide panel and reflect another part of the light to the inside thereof.

2. The display apparatus according to claim 1, wherein the transparent member comprises a triangular pillar shape formed by the first surface, the second surface and the third surface, and
the transparent member is disposed between the light source and the quantum dot conversion member.

3. The display apparatus according to claim 2, wherein the first surface and the second surface are disposed to be inclined at about 35 degrees to 75 degrees.

4. The display apparatus according to claim 3, wherein the light source is disposed substantially parallel to the first surface, and the quantum dot conversion member is disposed substantially parallel to the second surface.

5. The display apparatus according to claim 2, further comprising
a printed circuit board on which the light source and the quantum dot conversion member are mounted and a heat sink disposed in contact with the printed circuit board, and
heat generated from the quantum dot conversion member is directly transferred to the heat sink through the printed circuit board.

6. The display apparatus according to claim 5, wherein the transparent member is configured to limit heat generated from the light source to be transferred to the quantum dot conversion member.

7. The display apparatus according to claim 5, wherein the printed circuit board comprises a flat portion disposed parallel to the light guide panel and an inclined portion extending to be inclined with respect to the flat portion.

8. The display apparatus according to claim 7, wherein the quantum dot conversion member is disposed on the flat portion, and the light source is disposed on the inclined portion.

9. The display apparatus according to claim 8, wherein the quantum dot conversion member is disposed on a front surface of the flat portion, and the heat sink is disposed on a rear surface of the flat portion.

10. The display apparatus according to claim 7, wherein the quantum dot conversion member is disposed on the inclined portion, and the light source is disposed on the flat portion.

11. The display apparatus according to claim 1, wherein the first surface is configured to allow light emitted from the light source to be incident and to allow the incident light to be transmitted through the second surface or the third surface.

12. The display apparatus according to claim 11, wherein the second surface is configured
to allow light transmitted from the first surface or reflected from the third surface to be transmitted to the quantum dot conversion member, and
to allow light converted by the quantum dot conversion member to be incident again and allow the converted light to be transmitted to the first surface or the third surface.

13. The display apparatus according to claim 12, wherein the third surface is configured to allow light incident at a predetermined angle among light incident through the first surface or the second surface to be transmitted to the side surface of the light guide panel and to allow light incident at an angle larger than the predetermined angle to be reflected toward the first surface or the second surface.

14. The display apparatus according to claim 13, wherein the predetermined angle is in the range of 60 to 80 degrees.

15. The display apparatus according to claim 1, further comprising
an interspace formed between the third surface and the side surface of the light guide panel and configured to allow light transmitted from the third surface to move to the side surface of the light guide panel; and
a reflective member disposed on one side of the interspace and configured to reflect light traveling from the interspace to the outside of the side surface of the light guide panel toward the side surface of the light guide panel.

* * * * *